United States Patent [19]
Knowlton

[11] Patent Number: 5,886,089
[45] Date of Patent: Mar. 23, 1999

[54] GRIP AND FRICTION ENHANCEMENT COMPOSITIONS

[75] Inventor: Barry R. Knowlton, Mississauga, Canada

[73] Assignee: GFX Technologies, Inc., Mississauga, Canada

[21] Appl. No.: 868,702

[22] Filed: Jun. 4, 1997

[51] Int. Cl.[6] .................................................. C08L 83/00
[52] U.S. Cl. ......................... 524/544; 524/588; 524/837
[58] Field of Search ..................... 524/544, 588, 524/837

[56] References Cited

U.S. PATENT DOCUMENTS

| | | | |
|---|---|---|---|
| 4,598,429 | 7/1986 | Mulvaney | 2/169 |
| 4,689,832 | 9/1987 | Mulvaney | 2/169 |
| 4,745,139 | 5/1988 | Haasl et al. | 523/149 |
| 5,164,231 | 11/1992 | Davis | 427/256 |
| 5,254,391 | 10/1993 | Davis | 428/195 |
| 5,302,440 | 4/1994 | Davis | 428/196 |

FOREIGN PATENT DOCUMENTS

| | | |
|---|---|---|
| 2840197 | 3/1980 | Germany . |
| 04-345666 | 12/1992 | Japan . |
| 05-065475 | 3/1993 | Japan . |

*Primary Examiner*—Erma Cameron
*Attorney, Agent, or Firm*—Miller, Sisson, Chapman & Nash, P.C.

[57] ABSTRACT

The gripping characteristics of the contact surface of a sole, a grip, handle, glove or the hand are enhanced by having applied thereto an aqueous mixture of:

a) a fluoroalkyl acrylate copolymer emulsion; and
b) a silicone polymer micro emulsion;

and allowing said applied aqueous mixture to dry thus forming a thin film or a thin treated layer of either a continuous or discontinuous nature which imparts enhanced gripping characteristics to the substrate.

12 Claims, No Drawings

GRIP AND FRICTION ENHANCEMENT COMPOSITIONS

BACKGROUND OF THE INVENTION

1. Field of the Invention

This invention relates in general to coatings for contact surfaces and more specifically to coatings which impart enhanced gripping characteristics to substrates on which they are applied.

2. Prior Art

The handles of tools and sports equipment are generally made of hard materials such as wood, metal and composite materials (i.e. graphite and fibre glass). To improve one's grip on the aforementioned, a layer of soft material (i.e. rubber, plastic, leather or fabric) is often added to a hard handle. One's grip can be further improved by the use of a glove normally made from soft materials such as rubber, leather or fabric.

Sport and work footwear rely on non-rigid composite materials and or leather to form a pliable foundation for the sole, to which a layer or layers of softer material is added to perform as a traction or gripping aid for the contact surface.

U.S. Pat. No. 5,164,231 discloses a method for dissolving an oil modified, styrene/ethylene-butylene/styrene block copolymer at high temperature in a suitable aromatic hydrocarbon solvent and further applying the thus formed coating solution to the contact area of a handle or a glove. Upon drying, the coating provides an increase in the coefficient of friction of the contact surface. The specific physical properties of the coating include a hardness of 20 to 40 Shore A, a tensile strength of 700 to 1700 psi, an elongation of 400 to 1400% and a tear resistance of 100 to 400 pli.

U.S. Pat. No. 5,254,391, a division of U.S. Pat. No. 5,164,231, teaches the preparation of the coating solution from an oil modified, styrene/ethylene-butylene/styrene block copolymer, a plasticized polyvinyl chloride elastomer, a silicone rubber or a polyurethane elastomer. The specific physical properties are identical to those of the coating of U.S. Pat. No. 5,164,231.

U.S. Pat. No. 5,302,440, a continuation in part to U.S. Pat. No. 5,164,231, describes the coating being prepared from a cross-linked acrylic polymer, a plasticized polyvinyl chloride elastomer, a silicone rubber, or a polyurethane elastomer. The specific properties of the coating, having been changed from those stated in U.S. Pat. No. 5,164,231, include a hardness of 10 to 40 Shore A, a tensile strength of 400 to 1700 psi, an elongation of 200 to 1400% and a tear resistance of 50 to 400 pli.

U.S. Pat. No. 4,745,139 discloses surface coating formulations which provide anti-slip and increased frictional characteristics for surfaces which are in frequent contact with water and for application to the surfaces of plastic foam structures. The formulations consist of styrene/ethylene/butylene/styrene block copolymer, methylmethacrylate copolymer, rubber tackifiers, particulate colloidal or powdered silicon dioxide and glass microspheres. They are generally intended for the decks of surfboards and wind surfing equipment.

U.S. Pat. No. 4,598,429 discloses an adhesively tackified leather glove wherein at least a portion of the interior and the exterior are tackified using isobutylene-butene copolymer and a hydrocarbon tackifying resin and at least a portion of the interior is detackified with a nitrocellulose and silicone resin solution.

U.S. Pat. No. 4,689,832, a divisional of U.S. Pat. No. 4,598,429, discloses a process for tackifying leather glove material by immersing the material in an organic solvent solution containing the hydrocarbon tackifying resin and the isobutylene-butene copolymer, evaporating the solvent, detackifying at least a portion of the inner side by further applying thereto a solution containing nitrocellulose and a silicone resin, evaporating the solvent carrier and further sewing the leather into a glove.

SUMMARY OF THE INVENTION

According to the present invention there is provided a process whereby the gripping characteristics of the contact surface of a footwear sole, a grip, handle, glove or the hand can be temporarily enhanced and improved by applying thereto an aqueous mixture of:

a) a fluoroalkyl acrylate copolymer aqueous emulsion; and b) a silicone polymer micro emulsion; wherein the total solids content of the mixture is greater than 2% by weight, and allowing said applied aqueous mixture to dry under conditions which result in only a partially cross-linked fluoroalkyl acrylate copolymer, wherein the gripping characteristics of the surface are enhanced. Either a continuous or a discontinuous thin film of coating may thus be formed. The coating may be on non-porous substrates or on a thin treated layer on semi-porous and porous substrates.

The present invention also relates to a coating composition which enhances the gripping characteristics of such contact surfaces, the composition comprising and aqueous mixture of:

a) a fluoroalkyl acrylate copolymer aqueous emulsion; and b) a silicone polymer micro emulsion; wherein the total solids content of the mixture is greater than about 2% by weight. It is preferred that the polymer solid content ratio of the fluoroalkyl acrylate copolymer emulsion to the silicone polymer micro emulsion be in the range from 5 to 1 to 0.5 to 1, and preferably about 3 to 1 to about 0.8 to 1. The total percent of polymer solids of the aqueous mixture is in the range of from about 2% by weight to about 36% by weight.

The enhanced gripping characteristics of the coating composition and process of the present invention occur under dry, humid and moist atmospheric conditions. They posses aesthetic properties that can be made to range from extremely tacky to non-tacky while maintaining enhanced gripping characteristics.

The present invention further relates to a substrate having a contact surface or surfaces and having said aqueous mixture applied thereto and dried, resulting in enhanced gripping characteristics of the substrate.

DETAILED DESCRIPTION OF THE INVENTION

The process of this invention is applicable to a wide variety of sports and work related equipment and more specifically to the substrates used and their contact surfaces, loosely classified as either:

a) Non Porous—i.e. metals and wood used to form baseball bats and tool handles; rubber and plastic compounds used in footwear etc.; and b) Porous—i.e. leather and woven fabric used to make gloves for sports such as golf and hockey as well as work gloves etc.

With respect to the grip enhancing composition, two general types of polymers are preferred. The first polymer type is a fluoroalkyl acrylate copolymer aqueous emulsion commonly used as water and oil repellent sealant which upon application to a substrate and dried at room temperature will form a thin film with moderate adhesion strength to porous substrates and low adhesion strength to non-porous substrates. This type of copolymer generally requires a curing temperature of approximately 300 degrees F. for one minute to effect complete cross-linking of the copolymer creating a hard and hot water (140° F.) insoluble fluoroacrylic coating. But, when cured at less than 100 F. degrees for a period of at least 24 hours the cross-linking is far less than complete, creating a hot water (140° F.) soluble fluoroacrylic coating which is soft and tacky yet largely insoluble in 70° F. water. It is this partially cross-linked copolymer with its tacky nature and its water insolubility characteristics that provide the more noticeable properties of a tacky feel and water repellency. This is achieved when the acqueous mixture is applied to a substrate and dried at room temperature conditions, as would normally be the case.

The disadvantage of this partially cross-linked polymer, when used to coat a contact surface, is that it has the tendency to entrap foreign materials such as sand, dirt, and grass etc. which reduces the grip enhancement properties as well as creating an unsightly collection of debris on the contact surface.

The second polymer type is that of a silicone polymer micro emulsion having a particulate size ranging from 0.3 micron to 50 microns and preferably 0.5 micron to 10.0 microns and commonly used as a release agent for specialty molding applications and as a soil release agent for textile surfaces.

The fluoroalkyl acrylate copolymer aqueous emulsion itself should contain at least 0.5% by weight, and preferably about 35% per weight copolymer solids. The silicone polymer micro emulsion should itself contain at least 5% by weight and preferably about 16% by weight, polymer solids.

The incorporation of a selected amount, based on dry solids content, of said silicone polymer into a selected amount of said fluoroalkyl acrylate copolymer, based on dry solids content, and the resulting mixture being applied to a contact surface and allowed to dry at about room temperature will result in the contact surface exhibiting enhanced gripping characteristics and a high resistance to the entrapment of debris such as sand, dirt and grass. Furthermore the addition of the silicone polymer results in enhanced gripping characteristics over and above the enhancement resulting from the fluoroalkyl acrylate copolymer on its own.

The following examples are included to further illustrate the invention.

The fluoroakyl acrylate copolymer emulsion as used in the following examples, herein referred to as polymer "A", contained 30% by weight polymer solids and the silicone polymer micro emulsion as used in the following examples, herein referred to as polymer "B", contained 16% by weight polymer solids.

EXAMPLE #1

A 20% polymer solids coating solution was prepared by mixing 50 grams of polymer "A" with 31.25 grams of polymer "B" plus 18.75 grams of water and applied to the contact areas of the following items using an atomizing spray to provide adequate and complete coverage then allowed to dry at room temperature. The gripping contact areas treated included; a leather golf glove, a synthetic golf glove, a standard court shoe sole, a wooden baseball bat, a metal baseball bat, a wooden hammer handle, a plastic screw driver handle, a golf club grip and leather composite work glove. The contact surface of all the treated areas possessed the feeling of significantly superior gripping characteristics when compared to that of identical but untreated items.

EXAMPLE #2

A 2.0% polymer solids coating solution was prepared by mixing 5 grams of polymer "A" with 3.12 grams of polymer "B" plus 91.88 grams of water and applied to the contact areas of the same type of items as outlined in example #1 using an atomizing spray to provide adequate and complete coverage, then allowing to dry at room temperature. The contact surfaces of all the treated areas possed the feeling of only slightly noticeable grip enhancement when compared to that of identical but untreated items.

EXAMPLE #3

A 20% polymer solids coating solution was prepared using 66.66 grams of polymer "A" only plus 33.33 grams of water and applied as in example #1 to the contact areas of a golf glove and a golf club grip and dried. The gripping characteristics of these contact areas were noticeably inferior when compared to identical items from example #1 treated with mixture of "A" and "B" polymers.

EXAMPLE #4

The treated items of example #3 and the similar comparative items from example #1 used in example #3 were placed in a rotating drum containing sand, dirt and grass for a period of several minutes then the items were removed and compared with respect to the amount of debris adhering to the treated contact surfaces. The contact surfaces of the items from example #1 were essentially free of debris whereas the items treated in example #3 were literally coated with debris.

EXAMPLE #5

A 20% polymer solids coating solution was prepared by mixing 30 grams of polymer "A" with 70 grams of polymer "B" with no additional water and applied to the contact areas of the same type as outlined in example #1 using an atomized spray to provide adequate and complete coverage, then allowed to dry at room temperature. The contact surface of all treated areas possessed the feeling of superior gripping characteristics when compared to that of identical but untreated items.

Thus, it is apparent that there has been provided in accordance with the present invention, a process for enhancing the gripping characteristics of a contact surface as well as a composition for so doing. While the invention has been described in conjunction with (a) specific embodiment(s) thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

1. A composition for enhancing the gripping characteristics of a surface, the composition comprising an aqueous mixture of:
   a) a crosslinking fluoroalkyl acrylate copolymer aqueous emulsion; and
   b) a silicone polymer micro emulsion;
   wherein the total solids content of the mixture is greater than about 2% by weight.

2. A composition according to claim 1 wherein the polymer solid content ratio by weight of the fluoroalkyl acrylate copolymer aqueous emulsion to that of the silicone polymer micro emulsion is in the range of from about 5 to 1 to about 0.5 to 1.

3. A composition according to claim 1 wherein the polymer solid content ratio by weight of the fluoroalkyl acrylate copolymer aqueous emulsion to that of the silicone polymer micro emulsion is in the range of from about 3 to 1 to about 0.8 to 1.

4. A composition according to claim 2 wherein the total percent of polymer solids of the aqueous mixture is in the range of from about 2% by weight to about 36% by weight.

5. A composition according to claim 1 wherein the particle size of the silicone polymer in the emulsion ranges from about 0.3 micron to about 50 microns.

6. A composition according to claim 5 wherein the particle size of the silicone polymer in the emulsion ranges from about 0.5 micron to about 10.0 microns.

7. A composition according to claim 1 wherein the fluoroalkyl acrylate copolymer aqueous emulsion contains at least 0.5% by weight copolymer solids.

8. A composition according to claim 7 wherein the fluoroalkyl acrylate copolymer aqueous emulsion contains about 30% by weight polymer solids.

9. A composition according to claim 1 wherein the silicone polymer micro emulsion contains at least 5% by weight polymer solids.

10. A composition according to claim 9 wherein the silicone polymer micro emulsion contains about 16% by weight polymer solids.

11. A composition according to claim 9 wherein the fluoroalkyl acrylate copolymer aqueous emulsion contains at least 0.5% by weight copolymer solids.

12. A composition according to claim 10 wherein the fluoroalkyl acrylate copolymer aqueous emulsion contains about 30% by weight polymer solids.

* * * * *